United States Patent
Yamamoto et al.

(10) Patent No.: US 12,359,286 B2
(45) Date of Patent: Jul. 15, 2025

(54) MONOLAYER ALUMINUM ALLOY MATERIAL FOR BRAZING AND METHOD OF MANUFACTURING AN ALUMINUM STRUCTURE

(71) Applicant: UACJ Corporation, Tokyo (JP)

(72) Inventors: Dai Yamamoto, Aichi (JP); Phumprasop Kanokploy, Aichi (JP); Makoto Ando, Aichi (JP)

(73) Assignee: UACJ Corporation, Tokyo (JP)

(*) Notice: Subject to any disclaimer, the term of this patent is extended or adjusted under 35 U.S.C. 154(b) by 389 days.

(21) Appl. No.: 18/025,473

(22) PCT Filed: Sep. 22, 2021

(86) PCT No.: PCT/JP2021/034763
§ 371 (c)(1),
(2) Date: Mar. 9, 2023

(87) PCT Pub. No.: WO2022/071055
PCT Pub. Date: Apr. 7, 2022

(65) Prior Publication Data
US 2023/0323515 A1    Oct. 12, 2023

(30) Foreign Application Priority Data
Sep. 30, 2020 (JP) ................. 2020-165986

(51) Int. Cl.
*C22C 21/02* (2006.01)
*B23K 1/00* (2006.01)
(Continued)

(52) U.S. Cl.
CPC ............ *C22C 21/02* (2013.01); *B23K 1/00* (2013.01); *B23K 1/0012* (2013.01); *B23K 1/19* (2013.01);
(Continued)

(58) Field of Classification Search
CPC .......... C22C 21/02; C22C 21/10; B23K 1/00; B23K 35/286; B23K 2103/10;
(Continued)

(56) References Cited

U.S. PATENT DOCUMENTS

| | | | |
|---|---|---|---|
| 9,174,303 B2 | 11/2015 | Murase et al. | |
| 9,574,253 B2 | 2/2017 | Niikura et al. | |

(Continued)

FOREIGN PATENT DOCUMENTS

| CN | 110719965 A | 1/2020 | ............. C22C 21/00 |
|---|---|---|---|
| JP | 2003089839 A | 3/2003 | ............. C22C 21/02 |

(Continued)

OTHER PUBLICATIONS

English translation of the International Search Report dated Dec. 7, 2021 for parent application No. PCT/JP2021/034763.

(Continued)

*Primary Examiner* — Adil A. Siddiqui
(74) *Attorney, Agent, or Firm* — J-TEK LAW PLLC; Jeffrey D. Tekanic; Scott T. Wakeman (57) ABSTRACT

A brazing, monolayer, aluminum-alloy material has a chemical composition composed of Si: 1.5 mass % or more and 3.5 mass % or less, Fe: 0.05 mass % or more and 2.00 mass % or less, Mn: 0.1 mass % or more and 2.0 mass % or less, Mg: 0.005 mass % or more and 0.500 mass % or less, and Bi: 0.010 mass % or more and 0.500 mass % or less, the remainder being Al and unavoidable impurities; and has a metallographic structure in which Mg—Bi-series compounds are dispersed in an Al matrix. The surface-area ratio of the above-mentioned Mg—Bi-series compounds in any arbitrary cross section is 0.05% or more.

20 Claims, 2 Drawing Sheets

(51) Int. Cl.
*B23K 1/19* (2006.01)
*B23K 1/20* (2006.01)
*B23K 35/02* (2006.01)
*B23K 35/28* (2006.01)
*B23K 35/38* (2006.01)
*B23K 101/14* (2006.01)
*B23K 103/10* (2006.01)
*C22C 21/10* (2006.01)
*C22F 1/043* (2006.01)
*C22F 1/053* (2006.01)

(52) U.S. Cl.
CPC ............ *B23K 1/20* (2013.01); *B23K 35/0233* (2013.01); *B23K 35/286* (2013.01); *B23K 35/288* (2013.01); *C22F 1/043* (2013.01); *C22F 1/053* (2013.01); *B23K 35/38* (2013.01); *B23K 2101/14* (2018.08); *B23K 2103/10* (2018.08); *C22C 21/10* (2013.01)

(58) Field of Classification Search
CPC ........ B23K 35/38; B23K 1/0012; B23K 1/20; B23K 35/0233; B23K 35/288; B23K 2101/14; B23K 1/19; C22F 1/043; C22F 1/053

See application file for complete search history.

(56) References Cited

U.S. PATENT DOCUMENTS

| | | |
|---|---|---|
| 9,903,008 B2 | 2/2018 | Niikura et al. |
| 12,103,116 B2 | 10/2024 | Mori et al. |
| 2013/0206822 A1 | 8/2013 | Murase et al. |
| 2014/0360712 A1 | 12/2014 | Fujita et al. |
| 2015/0050520 A1 | 2/2015 | Niikura et al. |
| 2017/0137919 A1 | 5/2017 | Niikura et al. |
| 2018/0169797 A1* | 6/2018 | Izumi ................. B23K 35/0238 |
| 2019/0153576 A1 | 5/2019 | Kurosaki |
| 2022/0063024 A1 | 3/2022 | Mori et al. |
| 2022/0072665 A1 | 3/2022 | Mori et al. |

FOREIGN PATENT DOCUMENTS

| | | | |
|---|---|---|---|
| JP | 2007169740 A | 7/2007 | |
| JP | 4547032 B1 | 9/2010 | ............... B23K 1/00 |
| JP | 2012050992 A | 3/2012 | ............... B23K 1/00 |
| JP | 5021097 B2 | 9/2012 | |
| JP | 2012240089 A | 12/2012 | ............... B23K 1/00 |
| JP | 5337326 B1 | 11/2013 | |
| JP | 2019094517 A | 6/2019 | |
| WO | 2020152911 A1 | 7/2020 | |

OTHER PUBLICATIONS

English translation of the Written Opinion of the International Searching Authority for parent application No. PCT/JP2021/034763, dated Dec. 7, 2021.

Office Action from the Japanese Patent Office dispatched Aug. 20, 2024, in related Japanese application No. 2020-165986, and machine translation thereof.

Office Action from the Chinese Patent Office dispatched Apr. 24, 2025, in related CN application No. 202180062487.4, and translation thereof.

Office Action and Search Report from the Chinese Patent Office dispatched Nov. 5, 2024, in related CN application No. 202180062487.4, and translation thereof.

\* cited by examiner

MONOLAYER ALUMINUM ALLOY MATERIAL FOR BRAZING AND METHOD OF MANUFACTURING AN ALUMINUM STRUCTURE

CROSS-REFERENCE

This application is the US national stage of International Patent Application No. PCT/JP2021/034763 filed on Sep. 22, 2021, which claims priority to Japanese Patent Application No. 2020-165986 filed on Sep. 30, 2020.

TECHNICAL FIELD

The present invention relates to a monolayer, aluminum-alloy material for brazing and to a method of manufacturing an aluminum structure using the monolayer, aluminum-alloy material.

BACKGROUND ART

For example, aluminum products, such as heat exchangers, mechanical parts, and the like, comprise numerous components composed of aluminum materials (including aluminum and aluminum alloys; likewise hereinbelow). It is often the case that these components are brazed using a brazing sheet that comprises a core material and a filler material, which is provided on at least one surface of the core material. A flux-brazing method, in which brazing is performed by applying flux to an intended joint, i.e., to a surface or surfaces of portions to be joined by brazing, is often used as a method of brazing an aluminum material.

However, in flux-brazing methods flux and residues thereof adhere to the surface of the aluminum product after the brazing has completed. Depending on the application of the aluminum product, that flux and the residue thereof sometimes causes problems. For example, in a heat exchanger on which an electronic part is installed, there is a risk that problems will occur, such as degradation of surface treatability due to flux residue, during casting of the heat exchanger. In addition, for example, in water-cooled heat exchangers, there is also a risk that problems will occur such as the occurrence of clogging in the refrigerant passageway(s) caused by flux or the like. Furthermore, to remove flux and residues thereof, it is necessary to perform an acid-washing process, and in recent years the cost burden of that process has been viewed as a problem.

To solve such problems, so-called flux-free-brazing methods have been proposed, in which brazing is performed in an inert-gas atmosphere without applying flux to the surface(s) of the intended joint. With regard to brazing sheets used in flux-free-brazing methods, at least one layer of the layered structure thereof contains an element that acts to make oxide films brittle or acts to break down oxide films. Mg (magnesium) is often used as such an element.

The brazing sheet is prepared by joining an original sheet of the core material and an original sheet of the filler material to each other by cladding in order to prepare a clad material, after which the clad material is rolled. Consequently, there is a problem in that the manufacturing cost of the brazing sheet is relatively high.

In addition, in the field of, for example, automobile heat exchangers and the like, there is demand to make the sheet thickness of the brazing sheet thinner with the aim of reducing weight and improving heat-exchanging performance of the automobile heat exchanger. If the sheet thickness of the brazing sheet were to be made thinly, then the thickness of the filler material would become extremely thin, and consequently, in the process of manufacturing the brazing sheet, it would become difficult to keep the thickness of the filler material within the desired range.

In response to these problems, a monolayer, aluminum-alloy material has been proposed that is composed such that it can be brazed to an opposing material by producing a minute amount of melt by heating. As an example of this type of aluminum-alloy material, a monolayer, aluminum-alloy material that contains 0.2 mass % or more and 2.0 mass % or less of Mg is disclosed in, for example, Patent Document 1.

In addition, in Patent Document 2, a monolayer, aluminum-alloy material is disclosed that is composed of Si: 1.0 mass %-5.0 mass % and Fe: 0.01 mass %-2.0 mass % and further contains one or two or more selected from Mg: 2.0 mass % or less, Cu: 1.5 mass % or less, and Mn: 2.0 mass % or less, the remainder being Al and unavoidable impurities.

PRIOR ART LITERATURE

Patent Documents

Patent Document 1
  Japanese Patent No. 5021097
Patent Document 2
  Japanese Patent No. 5337326

SUMMARY OF THE INVENTION

However, because the aluminum-alloy materials described in Patent Document 1 and Patent Document 2 include Mg, which oxidizes relatively easily, oxide films tend to form on the surface. In particular, in the situation in which the moisture concentration, the oxygen concentration, or the like in the brazing atmosphere is relatively high, sturdy oxide films form on the surface of the aluminum-alloy material owing to reactions between Mg and the moisture, oxygen, or the like in the brazing atmosphere, which leads to degradation in brazeability.

It is one non-limiting object of the present teachings to provide a monolayer, aluminum-alloy material, in which brazing can be performed without using flux even in an inert-gas atmosphere that contains a relatively large amount of moisture, oxygen, or the like, and to provide a method of manufacturing of an aluminum structure using the monolayer, aluminum-alloy material.

In one aspect of the present teachings, a brazing, monolayer, aluminum-alloy material has:
  a chemical composition composed of Si (silicon): 1.5 mass % or more and 3.5 mass % or less, Fe (iron): 0.05 mass % or more and 2.00 mass % or less, Mn (manganese): 0.1 mass % or more and 2.0 mass % or less, Mg (magnesium): 0.005 mass % or more and 0.500 mass % or less, and Bi (bismuth): 0.010 mass % or more and 0.500 mass % or less, the remainder being Al (aluminum) and unavoidable impurities; and
  a metallographic structure in which Mg—Bi-series compounds are dispersed in an Al matrix;
  wherein the surface-area ratio of the above-mentioned Mg—Bi-series compounds in any arbitrary cross section is 0.05% or more.

Both Mg and Bi are included in the above-mentioned brazing, monolayer, aluminum-alloy material (hereinbelow, called "aluminum material"). By setting at least the chemical composition to the above-mentioned specific ranges, the above-mentioned aluminum material can form Mg—Bi-series compounds in the above-mentioned aluminum material.

Mg—Bi-series compounds are included in the above-mentioned aluminum material in an amount such that the surface-area ratio thereof in any arbitrary cross section becomes 0.05% or more. By forming Mg—Bi compounds in the above-mentioned specific amount in the aluminum material, the amount of Mg that is in solid solution in the Al matrix can be reduced, and thereby the growth of oxide films on the surface(s) of the aluminum material can be curtailed in the initial stage of brazing heating, even in an inert-gas atmosphere that contains a relatively large amount of moisture, oxygen, or the like.

In addition, the Mg—Bi-series compounds in the above-mentioned aluminum material melt before the above-mentioned aluminum material begins to melt, and therefore a melt that includes Mg and Bi is formed. By dispersing Mg and Bi in the melt on the surface of the material, oxide films present on the surface of the above-mentioned aluminum material, on the surface of the opposing material, or the like can be broken down to a certain extent before the above-mentioned aluminum material begins to melt.

Furthermore, as brazing heating proceeds, the above-mentioned aluminum material melts, and thereby the melt is formed. As described above, oxide films present on the surface of the above-mentioned aluminum material, on the surface of the opposing material, or the like are broken down to a certain extent, before the melt of the above-mentioned aluminum material is formed, by the Mg and Bi produced from the Mg—Bi-series compounds. Consequently, melt produced from the aluminum material can easily wet, and spread across, the surface of the opposing material.

In addition, by setting the chemical composition to the above-mentioned specific range, the above-mentioned aluminum material can concentrate Mg and Bi in the melt. For this reason, as the melt of the aluminum material makes contact with the surface of the aluminum material, the breakdown of oxide films present on the surface of the opposing material can be further promoted. As a result of the above, a robust brazed joint can be formed easily without using flux according to the above-mentioned aluminum material.

Therefore, according to the above-mentioned brazing, monolayer, aluminum-alloy material, brazing with an opposing material can be performed without using flux even in an inert-gas atmosphere that contains a relatively large amount of moisture, oxygen, or the like.

DETAILED DESCRIPTION (Brazing, Monolayer, Aluminum-Alloy Material)

The above-mentioned brazing, monolayer, aluminum-alloy material is constituted from a single layer of an aluminum alloy having the above-mentioned chemical composition. The chemical composition of the above-mentioned aluminum material and reasons for restrictions thereof will now be explained.

Si (Silicon): 1.5 Mass % or More and 3.5 Mass % or Less 1.5 mass % or more and 3.5 mass % or less of Si is included in the above-mentioned aluminum material as an essential component. By setting the Si content in the above-mentioned aluminum material to 1.5 mass % or more, a minute amount of melt that includes Al, Si, Mg, and Bi is produced by brazing heating, and thereby brazing to an opposing material can be performed. The Si content preferably is 2.0 mass % or more. In this situation, the amount of melt produced by brazing heating is made greater, and thereby brazeability can be further improved. In the situation in which the Si content is less than 1.5 mass %, there is a risk that the amount of melt produced by brazing heating will be insufficient, which will lead to degradation in brazeability.

On the other hand, if the Si content becomes excessive, then there is a risk that amount of aluminum material that melts during brazing heating will become too large, which will lead to a decrease in the strength of the aluminum material. As a result, there is a risk that the shape of an assembly that includes the above-mentioned aluminum material will no longer be able to be maintained during brazing. From the viewpoint of avoiding such a problem, the Si content is set to 3.5 mass % or less. From the same viewpoint, the Si content preferably is 3.0 mass % or less.

In addition, by setting the Si content to the above-mentioned specific range, Mg in the melt produced from the above-mentioned aluminum material by brazing heating can be concentrated. As a result, oxide films on the opposing material can be efficiently broken down by a relatively small amount of Mg, and thereby brazing to the opposing material can be performed. The reasons for this will be explained with reference to FIG. 1 and FIG. 2.

Figure 1:
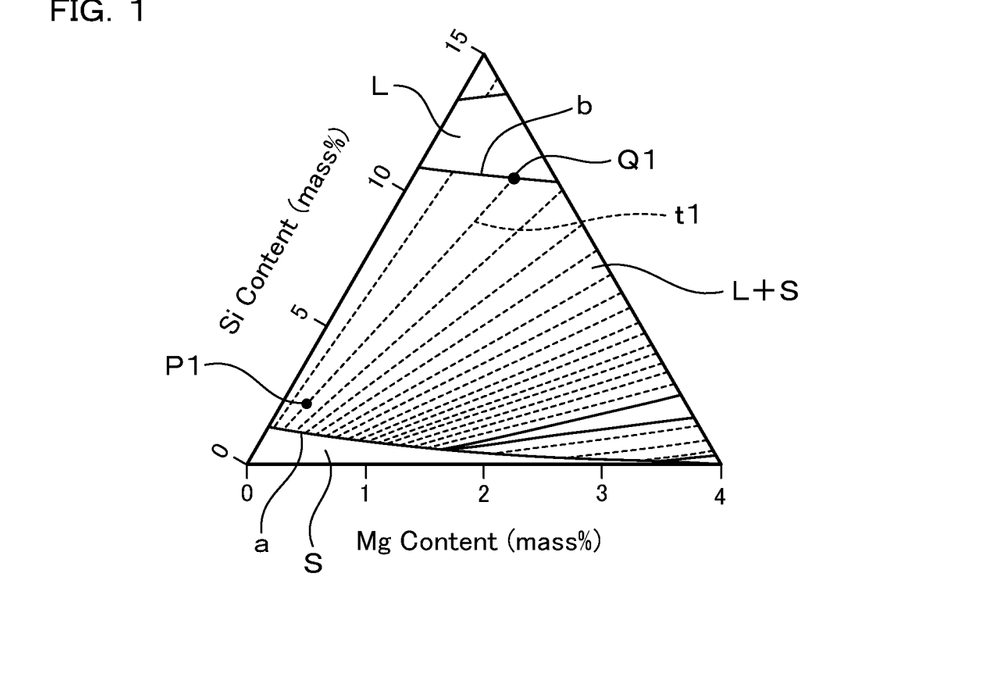
FIG. 1 is an explanatory diagram that explains the principle by which Mg from the aluminum material is concentrated in the melt.
Figure 2:
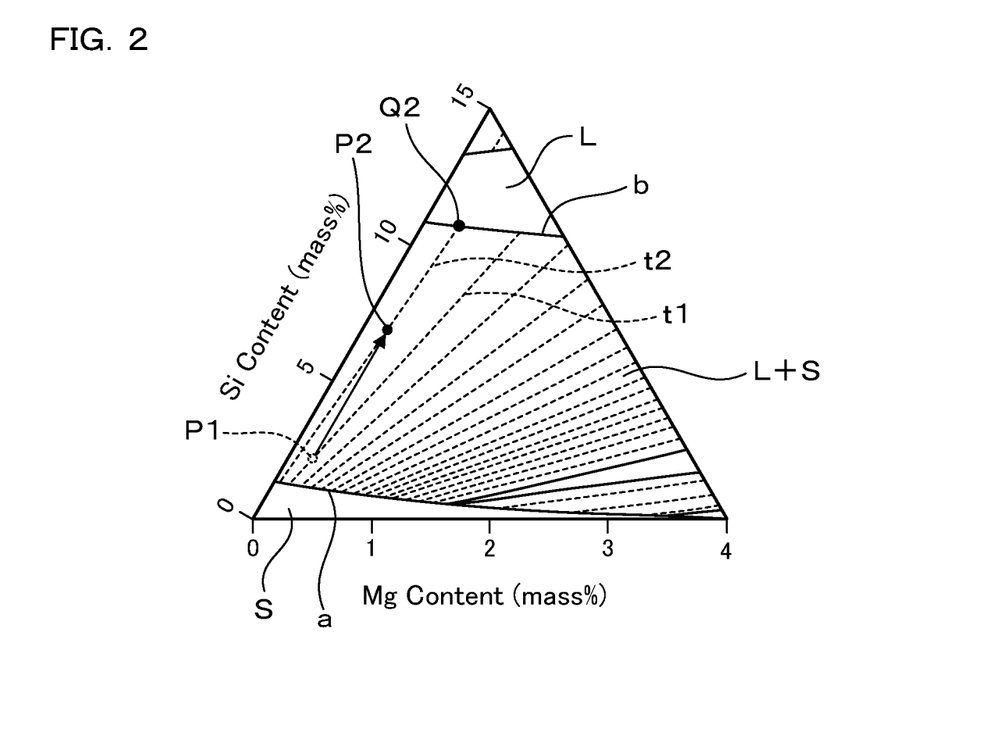
FIG. 2 is an explanatory diagram of an example in which concentration of Mg in the melt practically does not occur.

FIG. 1 and FIG. 2 are each an isothermal section, at a temperature of 590° C., of an Al—Si—Mg three-dimensional state diagram calculated using a thermodynamic computational system Thermo-Calc®. The axis extending from the lower left vertex in the drawing to the lower right vertex represents the Mg content (unit: mass %), and the axis extending from the lower left vertex to the upper vertex represents the Si content (unit: mass %).

In addition, region indicated by symbol L is the liquid-phase state, the region indicated by symbol S is the solid-phase state, the region indicated by symbol L+S is the state in which the solid phase and the liquid phase coexist, the boundary between the solid-phase state and the above-mentioned coexisting state is solidus line a, and the boundary between the above-mentioned coexisting state and the liquid-phase state is liquidus line b. Within the region that indicates the coexisting state of the solid phase and the liquid phase, tie lines for various compositions are indicated by broken lines.

In the situation in which an aluminum material having the composition indicated by point P1 on tie line t1 in FIG. 1 has been heated to 590° C., the aluminum material melts just slightly, and thereby a minute amount of melt is formed. The composition of the melt at this time becomes the composition indicated by the point of intersection Q1 between tie line t, on which point P1 is disposed, and liquidus line b.

Based on FIG. 1, when comparing the Mg content at point P1 and the Mg content at point Q1, the Mg content at point Q1 is greater than the Mg content at point P1. Accordingly, in the situation in which an aluminum material having the composition indicated by point P1 has been heated, it can be understood that the Mg content in the melt becomes greater than the Mg content in the aluminum material before heating, and thereby Mg is concentrated in the melt.

On the other hand, FIG. 2 shows point P2, at which the Si content alone has increased from the composition indicated by point P1 such that the composition is along tie line t2. In the situation in which an aluminum material having the composition indicated by point P2 has been heated to 590° C., the aluminum material melts, and thereby melt is formed. The composition of the melt at this time becomes the composition indicated by the point of intersection Q2 between tie line t2, on which point P2 is disposed, and liquidus line b.

Based on FIG. 2, when comparing the Mg content at point P2 and the Mg content at point Q2, it can be understood that the Mg content at point Q2 is on par with that of the Mg content at point P2. Accordingly, in the situation in which an aluminum material having the composition indicated by point P2 has been heated, it can be understood that the Mg content in the melt is on par with that of the aluminum material before heating, and thereby concentration of Mg in the melt practically does not occur.

In actuality, not only Al, Si, and Mg are included in the above-mentioned aluminum material, but also other elements such as Fe and Bi. For this reason, the Mg content in the melt sometimes differs somewhat from the value based on the Al—Si—Mg three-dimensional state diagram described above. However, as a result of conducting diligent investigation, the present inventors discovered that, by setting the amount of Si in the aluminum material to the above-mentioned specific range, the Mg in the melt of the aluminum material can be effectively concentrated, thus leading to the consummation of the present invention.

Mg (Magnesium): 0.005 Mass % or More and 0.500 Mass % or Less 0.005 mass % or more and 0.500 mass % or less of Mg is included in the above-mentioned aluminum material as an essential component. The Mg atoms in the above-mentioned aluminum material are present in the form of: solid solution Mg that has formed as a solid solution in the Al matrix; Mg—Bi-series compounds; and the like. Mg acts to break down oxide films present on the surface of the above-mentioned aluminum material and on the surface of the opposing material joined to the above-mentioned aluminum material. By setting the Mg content in the aluminum material to the above-mentioned specific range, a robust brazed joint can be formed with the opposing material even in an inert-gas atmosphere that contains a relatively large amount of moisture, oxygen, or the like.

In the situation in which the Mg content in the aluminum material is less than 0.005 mass %, there is a risk that the Mg content in the melt of the aluminum material will become insufficient, which will lead to degradation in brazeability. Accordingly, from the viewpoint of avoiding degradation in brazeability due to Mg insufficiency, the Mg content in the above-mentioned aluminum material is set to 0.005 mass % or more. From the viewpoint of further increasing the Mg content in the melt, the Mg content in the above-mentioned aluminum material preferably is 0.010 mass % or more and more preferably is 0.020 mass % or more.

On the other hand, if the Mg content becomes excessive, then there is a risk that sturdy oxide films will form on the surface of the aluminum material due to reactions between Mg and minute amounts of moisture, oxygen, or the like in the brazing atmosphere, which will lead to degradation in brazeability. In addition, in this situation, there is a risk that the strength of the aluminum material will decrease during brazing, and thereby deformation, buckling, or the like of the aluminum material will occur. From the viewpoint of avoiding these problems, the Mg content in the above-mentioned aluminum material is set to 0.500 mass % or less. From the same viewpoint, the Mg content in the aluminum material preferably is 0.200 mass % or less and more preferably is 0.050 mass % or less.

In addition, the above-mentioned aluminum material preferably is composed such that, in the situation in which the aluminum material has been heated to 590° C., the Mg content is 0.010 mass % or more and a melt can be formed that is 1.5 times or more that of the Mg content in the above-mentioned aluminum material before heating.

According to such an aluminum material, the amount of Mg in the melt can be made sufficiently large even in the situation in which the Mg content in the aluminum material is a relatively small amount. As a result, the oxide films present on the surface of the opposing material during brazing will break down, and thereby brazeability can be further improved.

From the viewpoint of further improving brazeability, the above-mentioned aluminum material preferably is composed such that, in the situation in which it has been heated to 590° C., melt can form in which the Mg content is 0.030 mass % or more, and yet more preferably is composed such that melt can form in which the Mg content is 0.100 mass % or more.

Bi (Bismuth): 0.010 Mass % or More and 0.500 Mass % or Less 0.010 mass % or more and 0.500 mass % or less of Bi is included in the above-mentioned aluminum material as an essential component. Together with Mg in the aluminum material, Bi forms Mg—Bi-series compounds. Bi acts to improve the fluidity of the melt produced by brazing heating and makes brittle the oxide films present on the above-mentioned aluminum material and present on the surface of the opposing material joined to the above-mentioned aluminum material.

By setting the Bi content in the above-mentioned aluminum material to 0.010 mass % or more, Bi tends to concentrate in the oxide films. Furthermore, owing to the concentrating of Bi in the oxide films, the effect of the oxide films being made brittle by Bi and the effect of the oxide films being broken down by Mg act synergistically, and thereby the oxide films can be broken down effectively. In addition, by setting the Bi content in the above-mentioned aluminum material to 0.010 mass % or more, the fluidity of the melt can be improved. As a result, brazeability can be improved even in an inert-gas atmosphere that contains a relatively large amount of moisture, oxygen, or the like. In the situation in which the Bi content in the above-mentioned aluminum material is less than 0.010 mass %, there is a risk that the functions and effects described above due to Bi will become insufficient, which will lead to degradation in brazeability.

On the other hand, in the situation in which the Bi content is excessive, there is a risk that elementary substances of Bi will tend to precipitate in the process of manufacturing the above-mentioned aluminum material, which will lead to a decrease in the manufacturability of the above-mentioned aluminum material. From the viewpoint of avoiding such a problem, the Bi content is set to 0.500 mass % or less. From the same viewpoint, the Bi content preferably is 0.200 mass % or less and more preferably is 0.100 mass % or less.

Surface-Area Ratio of Mg—Bi-Series Compound: 0.05% or More

The above-mentioned aluminum material has a metallographic structure in which Mg—Bi-series compounds that include Mg and Bi are dispersed in the Al matrix. The surface-area ratio of the above-mentioned Mg—Bi-series compounds in any arbitrary cross section of the above-mentioned aluminum material is 0.05% or more.

If Mg—Bi-series compounds are formed as second-phase particles in the Al matrix, then the Al matrix will tend not to oxidize because the amount of solid solution Mg dissolved in the Al matrix becomes relatively small. By forming Mg—Bi-series compounds in the aluminum material in an amount such that the surface-area ratio in any arbitrary cross section becomes 0.05% or more, the growth of oxide films on the surface(s) of the above-mentioned aluminum material can be curtailed in the initial stage of brazing.

In addition, as brazing proceeds and the temperature of the above-mentioned aluminum material rises, the Mg—Bi-series compounds melt and thereby form a melt that includes Mg and Bi. This melt acts as a source for the supply of Mg and Bi to the surface of the material. Therefore, by forming Mg—Bi-series compounds in the aluminum material, the oxide films present on the surface of the above-mentioned aluminum material, on the surface of the opposing material, and the like can be broken down to a certain extent in the interval of time until the above-mentioned aluminum material melts. In addition, after the above-mentioned aluminum material has melted, owing to the Mg and Bi being supplied from the melted Mg—Bi-series compounds to the melt of the above-mentioned aluminum material, the Mg concentration and the Bi concentration in the melt can be made sufficiently high. As a result, the oxide films present on the surface of the above-mentioned aluminum material and on the surface of the opposing material can be effectively broken down.

Accordingly, by setting the surface-area ratio of the above-mentioned Mg—Bi-series compounds in any arbitrary cross section of the above-mentioned aluminum material to 0.05% or more, brazing can be performed while curtailing oxidation of the above-mentioned aluminum material and the opposing material, even in an inert-gas atmosphere that contains a relatively large amount of moisture, oxygen, or the like. From the viewpoint of more reliably exhibiting the functions and effects described above, the surface-area ratio of the Mg—Bi-series compounds in any arbitrary cross section of the above-mentioned aluminum material preferably is 0.07% or more and more preferably is 0.10% or more.

From the viewpoint of further increasing the functions and effects described above, although there is no upper limit to the surface-area ratio of the above-mentioned Mg—Bi-series compounds in any arbitrary cross section of the aluminum material, with regard to an aluminum material having the above-mentioned specific chemical composition, the surface-area ratio of the Mg—Bi-series compounds is normally 20% or less. The surface-area ratio of the Mg—Bi-series compounds preferably is 10% or less, more preferably is 7% or less, and yet more preferably is 5% or less.

Fe (iron): 0.05 mass % or more and 2.00 mass % or less 0.05 mass % or more and 2.00 mass % or less of Fe is included in the above-mentioned aluminum material as an essential component. Fe disperses as crystallized products in the above-mentioned aluminum material, thereby curtailing a decrease in strength, particularly at high temperatures. By setting the Fe content to 0.05 mass % or more, such functions and effects can be sufficiently obtained. From the viewpoint of more effectively curtailing a decrease in strength at high temperatures, the Fe content preferably is 0.10 mass % or more.

In the situation in which the Fe content is less than 0.05 mass %, there is a risk that the strength of the above-mentioned aluminum material at high temperatures will decrease. In addition, in this situation, it is necessary to use high purity metal in the preparation of the above-mentioned aluminum material, and thereby cost increases.

On the other hand, in the situation in which the Fe content is greater than 2.00 mass %, coarse intermetallic compounds tend to be produced during casting in the process of manufacturing the above-mentioned aluminum material. In addition, in this situation, the crystal grains of the Al matrix tend to become fine owing to recrystallization during brazing. As a result, there is a risk that the grain-boundary density of the Al matrix will increase, and thereby buckling will tend to occur.

Mn (Manganese): 0.1 Mass % or More and 2.0 Mass % or Less 0.1 mass % or more and 2.0 mass % or less of Mn is included in the above-mentioned aluminum material as an essential component. Mn forms Al—Mn—Si-series intermetallic compounds in the above-mentioned aluminum material, which improves the strength of the above-mentioned aluminum material owing to dispersion strengthening. In addition, Mn forms a solid solution in the Al matrix and acts to improve the strength of the above-mentioned aluminum material owing to solid-solution strengthening.

By setting the Mn content in the above-mentioned aluminum material to 0.1 mass % or more, the strength of the above-mentioned aluminum material due to dispersion strengthening and solid-solution strengthening can be improved. Furthermore, with regard to the above-mentioned aluminum material, a decrease in strength during brazing heating is curtailed owing to the dispersion strengthening and the solid-solution strengthening described above, and thereby the occurrence of deformation, buckling, or the like of the aluminum material can be curtailed. In the situation in which the Mn content is less than 0.1 mass %, there is a risk that the effect of improving strength due to Mn will become low, and thereby deformation, buckling, or the like of the above-mentioned aluminum material will tend to occur.

On the other hand, in the situation in which the Mn content is excessive, coarse intermetallic compounds tend to form in the process of manufacturing the above-mentioned aluminum material. If rolling is performed with these coarse intermetallic compounds included as is, then there is a risk that pinholes will tend to occur. From the viewpoint of avoiding such a problem, the Mn content is set to 2.0 mass % or less.

The chemical composition of the above-mentioned aluminum material may be composed of only the essential components described above, Al and unavoidable impurities. That is, only Si: 1.5 mass % or more and 3.5 mass % or less, Fe: 0.05 mass % or more and 2.00 mass % or less, Mn: 0.1 mass % or more and 2.0 mass % or less, Mg: 0.005 mass % or more and 0.500 mass % or less, Bi: 0.010 mass % or more and 0.500 mass % or less, Al, and unavoidable impurities may be included in the above-mentioned aluminum material. Furthermore, in addition to the essential components described above, optional components, elements such as Zn (zinc), In (indium), Sn (tin), Cu (copper), Zr (zirconium), Ti (titanium), Sr (strontium), Na (sodium), and Sb (antimony), may be further included in the chemical composition of the above-mentioned aluminum material.

Zn: 6.0 mass % or less 0 mass % or more and 6.0 mass % or less of Zn may be included in the above-mentioned aluminum material as an optional component. Zn acts to improve the corrosion resistance of the aluminum structure after brazing. When the above-mentioned aluminum material is heated to the brazing temperature, Zn in the above-mentioned aluminum material elutes into the melt, and thereby Zn concentrates in the melt. By solidifying this melt after brazing, the electric potential of the surface of the above-mentioned aluminum material and the electric potential of the brazed joint formed between the above-mentioned aluminum material and the opposing material decrease, and these portions can function as sacrificial corrosion-inhibiting materials.

By making the Zn content in the above-mentioned aluminum material greater than 0 mass %, such functions and effects are exhibited, and the corrosion resistance of the aluminum structure can be further improved. From the viewpoint of further improving corrosion resistance, the Zn content in the aluminum material preferably is 0.05 mass % or more and more preferably is 0.5 mass % or more.

On the other hand, in the situation in which the Zn content is excessive, there is a risk that it will lead to a decrease in self-corrosion resistance of the above-mentioned aluminum material. By setting the Zn content to 6.0 mass % or less, preferably to 4.0 mass % or less, and more preferably to 3.0 mass % or less, such a problem can be more reliably avoided.

In: 0.1 Mass % or Less 0 mass % or more and 0.1 mass % or less of In may be included in the above-mentioned aluminum material as an optional component. Similar to Zn, In acts to improve corrosion resistance of the aluminum structure after brazing. When the above-mentioned aluminum material is heated to the brazing temperature, In in the above-mentioned aluminum material elutes into the melt, and thereby In concentrates in the melt. By solidifying this melt after brazing, the electric potential of the surface of the above-mentioned aluminum material and the electric potential of the brazed joint formed between the above-mentioned aluminum material and the opposing material decrease, and these portions can be caused to function as sacrificial corrosion-inhibiting materials.

By making the In content in the aluminum material greater than 0 mass %, such functions and effects are exhibited, and thereby corrosion resistance of the aluminum structure can be further improved. From the viewpoint of further improving corrosion resistance, the In content in the aluminum material preferably is 0.005 mass % or more and more preferably is 0.01 mass % or more.

On the other hand, in the situation in which the In content is excessive, there is a risk that it will lead to a decrease in self-corrosion resistance of the above-mentioned aluminum material. By setting the In content to 0.1 mass % or less and preferably to 0.05 mass % or less, such a problem can be more reliably avoided.

Sn: 0.1 Mass % or Less 0 mass % or more and 0.1 mass % or less of Sn may be included in the above-mentioned aluminum material as an optional component. Similar to Zn, Sn acts to improve corrosion resistance of the aluminum structure after brazing. When the above-mentioned aluminum material is heated to the brazing temperature, Sn in the above-mentioned aluminum material elutes into the melt, and thereby Sn concentrates in the melt. By solidifying this melt after brazing, the electric potential of the surface of the above-mentioned aluminum material and the electric potential of the brazed joint formed between the above-mentioned aluminum material and the opposing material decrease, and these portions can be caused to function as sacrificial corrosion-inhibiting materials.

By making the Sn content in the aluminum material greater than 0 mass %, such functions and effects are exhibited, and thereby corrosion resistance of the aluminum structure can be further improved. From the viewpoint of further improving corrosion resistance, the Sn content in the aluminum material preferably is 0.005 mass % or more and more preferably is 0.01 mass % or more.

On the other hand, in the situation in which the Sn content is excessive, there is a risk that it will lead to a decrease in self-corrosion resistance of the above-mentioned aluminum material. By setting the Sn content to 0.1 mass % or less and preferably to 0.05 mass % or less, such a problem can be more reliably avoided.

Cu: 0.6 Mass % or Less 0 mass % or more and 0.6 mass % or less of Cu may be included in the above-mentioned aluminum material as an optional component. Cu forms a solid solution in the Al matrix and thereby acts to increase the strength of the above-mentioned aluminum material. By setting the Cu content in the above-mentioned aluminum material greater than 0 mass %, such functions and effects are exhibited, and thereby the strength of the aluminum material can be further improved. From the viewpoint of further increasing the strength of the aluminum material, the Cu content in the aluminum material preferably is 0.05 mass % or more.

On the other hand, if the Cu content becomes excessive, the amount of the aluminum material that melts during brazing heating will become large, which will lead to a decrease in the strength of the aluminum material. As a result, there is a risk that it will no longer be possible to maintain the shape of the assembly during brazing. In addition, in the situation in which the Cu content is excessive, there is a risk that it will lead to a decrease in corrosion resistance of the above-mentioned aluminum material. By setting the Cu content to 0.6 mass % or less, preferably to 0.4 mass % or less, and yet more preferably to 0.2 mass % or less, these problems can be more reliably avoided.

Zr: 0.3 Mass % or Less 0 mass % or more and 0.3 mass % or less of Zr may be included in the above-mentioned aluminum material as an optional component. Zr increases pre-brazing strength and post-brazing strength and increases the coarseness of the post-brazing grain size, and thereby acts to improve high temperature buckling resistance and brazeability. By setting the Zr content in the aluminum material greater than 0 mass %, such functions and effects are exhibited, the pre-brazing strength and the post-brazing strength are further improved, and thereby high temperature buckling resistance and brazeability can be further improved.

On the other hand, in the situation in which the Zr content in the aluminum material is excessive, coarse crystallized products tend to be produced in the process of manufacturing the above-mentioned aluminum material. By setting the Zr content in the above-mentioned aluminum material to 0.3 mass % or less, such a problem can be more reliably avoided.

Ti: 0.3 Mass % or Less 0 mass % or more and 0.3 mass % or less of Ti may be included in the above-mentioned aluminum material as an optional component. Ti forms a solid solution in the Al matrix, thereby acting to increase strength, and distributes in the above-mentioned aluminum material in a laminar manner, thereby acting to prevent the advance of corrosion in the sheet-thickness direction. By setting the Ti content in the above-mentioned aluminum material greater than 0 mass %, these functions and effects can be exhibited.

On the other hand, if the Ti content becomes excessive, coarse intermetallic compounds will tend to form in the process of manufacturing the above-mentioned aluminum material. If rolling is performed with these coarse intermetallic compounds included as is, there is a risk that the aluminum material will tend to crack, with the coarse intermetallic compounds serving as starting points. By setting the Ti content in the aluminum material to 0.3 mass % or less and preferably to 0.2 mass % or less, such problems can be more reliably avoided.

Sr: 0.1 Mass % or Less, Na: 0.1 Mass % or Less, Sb: 0.3 Mass % or Less

One or two or more elements selected from the group consisting of 0 mass % or more and 0.1 mass % or less of Sr, 0 mass % or more and 0.1 mass % or less of Na, and 0 mass % or more and 0.3 mass % or less of Sb may be included in the above-mentioned aluminum material as an optional component or optional components. These elements increase the fineness of the Si particles in the above-mentioned aluminum material and thereby act to evenly distribute the Si particles on the surface of the aluminum material. Because the Si particles become starting points at which the melt is formed, by evenly distributing the Si particles on the surface of the aluminum material, the melt can be evenly formed on the surface of the aluminum material.

By making the content of the above-described elements in the above-mentioned aluminum material greater than 0 mass %, the melt forms evenly on the surface of the aluminum material, and thereby a large amount of melt can be supplied to the portion to be joined with the opposing material. As a result, brazeability can be improved. On the other hand, in the situation in which the content of the above-described elements is excessive, there is a risk that compounds of these elements and Mg and Bi will tend to form during casting, and thereby it will become difficult to perform casting. By setting the Sr content, the Na content, and the Sb content to the above-mentioned specific ranges, respectively, such problems can be easily avoided. From the same viewpoint, the Sr content preferably is 0.05 mass % or less, the Na content preferably is 0.05 mass % or less, and the Sb content preferably is 0.2 mass % or less.

In addition, elements such as Ag, B, Be, Ca, Cd, Co, Ga, Ge, Hg, Li, Mo, Ni, P, Pb, V, and Y, may be included in the above-mentioned aluminum material as unavoidable impurities. The content of these elements as unavoidable impurities normally is 0.05 mass % or less for each element. In addition, the total of the unavoidable impurities included in the above-mentioned aluminum material preferably is 0.15 mass % or less.

The shape of the above-mentioned aluminum material is not particularly limited. For example, the above-mentioned aluminum material may be a sheet material or may be a bar material. In the situation in which the above-mentioned aluminum material is a sheet material, the above-mentioned aluminum material preferably has a sheet thickness of less than 0.15 mm. With regard to previously existing brazing sheets, as described above, if the sheet thickness of the entire brazing sheet were to be made thinly, then there is a risk that the thickness of the filler material would become extremely thin, and therefore there is a problem in that it would become difficult to keep the thickness of the filler material within the desired range.

The above-mentioned aluminum material will melt very slightly due to brazing heating, and the melt can be caused to exude from the entire surface thereof. Consequently, even in the situation in which the sheet thickness is thin, a sufficient amount of the melt can be produced. In addition, because the above-mentioned aluminum material is composed of a single layer, the manufacturing cost can be made lower than that of previously existing brazing sheets. For this reason, the thinner the sheet thickness, the more that the effects of improving brazeability and reducing the manufacturing cost of the above-mentioned aluminum material can be increased. In particular, with regard to an extremely thin sheet thickness of less than 0.15 mm, the above-mentioned aluminum material is more advantageous than previously existing brazing sheets from the perspectives of both brazeability and cost.

(Method of Manufacturing Aluminum Structure)

Brazing in which the above-mentioned aluminum material is used can be performed, for example, as follows. First, an assembly that includes the above-mentioned aluminum material is prepared. The assembly may be constituted from only the above-mentioned aluminum material, or some other aluminum product may be included with the above-mentioned aluminum material.

For example, in the situation in which a heat exchanger is to be prepared as the aluminum structure, a heat-exchanger core can be prepared as the assembly by alternately layering a corrugated fin, which has been prepared from the above-mentioned aluminum material, and a flat, multi-hole pipe, which has been separately prepared. Furthermore, a header or the like may be mounted on the heat-exchanger core.

Without applying flux, the assembly is heated under the heating conditions of a temperature within the range of 580° C.-590° C. and a time of 30 seconds or more. The atmosphere during brazing preferably is an inert-gas atmosphere. For example, nitrogen, argon, or the like can be used as the inert gas. The dew point of the inert gas preferably is −35° C. or lower, more preferably is −50° C. or lower, and particularly preferably is −60° C. or lower. In addition, the oxygen concentration in the inert-gas atmosphere preferably is 200 vol. ppm or less, more preferably is 100 vol. ppm or less, yet more preferably is 10 vol. ppm or less, and particularly preferably is 5 vol. ppm or less.

Because the above-mentioned aluminum material has the above-mentioned specific chemical composition and has a metallographic structure in which Mg—Bi-series compounds are distributed in the Al matrix, satisfactory brazeability can be exhibited, even in an inert-gas atmosphere having a relatively high moisture content and oxygen content, in which the dew point is −50° C. or lower and the oxygen concentration is 100 vol. ppm or less, as a flux-free-brazing method.

By heating the above-mentioned assembly in the above-described inert-gas atmosphere, the above-mentioned aluminum material melts, and thereby a melt is formed. By brazing the above-mentioned aluminum material and an opposing material using this melt, an aluminum structure can be obtained.

In the method of manufacturing an aluminum structure using the above-mentioned aluminum material, it is preferable that at least one from among the above-mentioned aluminum material and the opposing material, which makes contact with the above-mentioned aluminum material in the assembly, is etched.

That is, when preparing an aluminum structure in which the above-mentioned aluminum material is used, it is preferable to:
  prepare an assembly, which comprises the brazing, monolayer, aluminum-alloy material and an opposing material that makes contact with the brazing, monolayer, aluminum-alloy material, and wherein etching is performed on at least one from among the brazing, monolayer, aluminum-alloy material and the opposing material;
  form a melt, in which a portion of the brazing, monolayer, aluminum-alloy material is melted by heating the assembly under heating conditions in which the temperature is within the range of 580° C.-590° C. and the time is 30 seconds or more; and
  prepare the aluminum structure, in which the assembly is brazed by the melt.

Thus, by performing brazing in the state in which etching has been performed on at least one from among the aluminum material and an opposing material, brazing can be performed in the state in which the oxide films, which are present at portions at which the brazed joint is to be formed, are more brittle. As a result, brazeability can be further improved even in an inert-gas atmosphere that contains a relatively large amount of moisture, oxygen, or the like.

The timing at which etching is performed on the aluminum material and/or on the opposing material is not particularly limited, as long as it is prior to the performance of brazing heating. For example, the assembly may be prepared using a pre-etched aluminum material and opposing material, or etching may be performed on each assembly after the assembly has been prepared.

The etching method is not particularly limited; for example, a method in which the aluminum material and/or the opposing material are brought into contact with an acid or an alkali can be used. With regard to etching, prior to the etching, the oxide film(s) present on the surface of the aluminum material and the surface of the opposing material may be completely removed, or a portion of the oxide film(s) may be removed. In addition, after etching has completed, postprocessing, such as rinsing, removal of smut produced by the etching, or the like may be performed as needed.

WORKING EXAMPLES

Working examples of the above-mentioned brazing, monolayer, aluminum-alloy material are explained below. It is noted that the specific aspects of such a brazing, monolayer, aluminum-alloy material and the manufacturing method thereof are not limited to the working examples below, and their constitutions can be modified as appropriate within a range that does not depart from the gist of the present invention.

Working Example 1

In the present example, an example of the above-mentioned brazing, monolayer, aluminum-alloy material and the manufacturing method thereof will be explained. The aluminum materials of the present example have chemical compositions composed of Si: 1.5 mass % or more and 3.5 mass % or less, Fe: 0.05 mass % or more and 2.00 mass % or less, Mn: 0.1 mass % or more and 2.0 mass % or less, Mg: 0.005 mass % or more and 0.500 mass % or less, and Bi: 0.010 mass % or more and 0.500 mass % or less, and as an optional component or optional components, one or two elements from among Cu: 0 mass % or more and 0.6 mass % or less, and Sr: 0 mass % or more and 0.1 mass % or less, the remainder being Al and unavoidable impurities. In addition, the aluminum materials of the present example have metallographic structures in which Mg—Bi-series compounds were distributed in the Al matrix, and the surface-area ratio of the above-mentioned Mg—Bi-series compounds in any arbitrary cross section is 0.05% or more. More specific compositions of the aluminum material are explained below, along with the manufacturing method.

[Method of Manufacturing Aluminum Material]

It was possible to prepare the aluminum materials of the present example by, for example, rolling a cast plate that had been prepared by a dual-roll-type, continuous-casting, rolling method. Specifically, first, cast plates having the chemical compositions shown in Table 1 were prepared using the dual-roll-type, continuous-casting, rolling method. The temperature of the molten metal during casting was set as appropriate, for example, within the range of 650° C.-800° C. In addition, the casting speed was set as appropriate, for example, in the range of 0.5-2.0 mm/min. The dimensions of the cast plates were not particularly limited but, for example, the thickness was 6 mm. It is noted that the symbol "–" in Table 1 indicates that the content of the corresponding element was less than the detection limit of the emission-spectral-analysis apparatus (a so-called count meter), and the symbol "Bal." indicates that it was the remainder.

Subsequently, it was possible to obtain aluminum materials by combining rolling and heat treatment as appropriate in accordance with the desired thicknesses and temper. For example, in the situation in which the aim was to obtain an aluminum material having a thickness of 0.20 mm and that has been tempered to an O material, intermediate annealing was performed by maintaining the cast plate at a temperature of 360° C. for 3 hours. Cold rolling was performed on the cast plate after the intermediate annealing to make a rolled sheet having a thickness of 0.20 mm, after which annealing was performed by holding the rolled sheet at a temperature of 360° C. for 3 hours.

In addition, in the situation in which the aim was to obtain an aluminum material having a thickness of 0.070 mm and that has been tempered to an H14 material, cold rolling was performed on the cast plate after casting to make a rolled sheet having a thickness of 0.100 mm. Next, intermediate annealing was performed by maintaining the rolled sheet at a temperature of 360° C. for 3 hours. Then, cold rolling was further performed on the rolled sheet after the intermediate annealing to make the thickness 0.070 mm.

Based on the above, it was possible to obtain aluminum materials (Table 1, Test Materials S1-S8 and Test Materials S15-S17) having the above-mentioned specific chemical compositions and metallographic structures. It is noted that Test Materials S9-S14 and S18-S25 shown in Table 1 are test materials for the purpose of comparison with Test Materials S1-S8 and Test Materials S15-S17. The chemical composition, the temper, and the thickness of each test material was as shown in Table 1. With regard to Test Materials S11, S14, S21, S23, and S25 shown in Table 1, because the Bi content, the Fe content, the Mn content, and the Sr content in the chemical compositions were above the above-mentioned specific ranges, it was difficult to prepare the cast plates using the dual-roll-type, continuous-casting, rolling method. For this reason, subsequent evaluation of these test materials was omitted.

It is noted that, in the method of manufacturing described above, an example of a method of preparing aluminum materials from cast plates obtained using the dual-roll-type, continuous-casting, rolling method was explained, but the method of preparing the cast plates was not limited to the dual-roll-type, continuous-casting, rolling method, and it was also possible to use other methods, such as DC casting. In the situation in which an aluminum material was to be prepared from a cast plate obtained using a DC-casting method, for example, the conditions below were used.

That is, first, after an ingot having a chemical composition shown in Table 1 was prepared using the DC-casting method, a homogenization treatment was performed by maintaining the ingot at a temperature of 520° C. for 3 hours. Then, hot rolling was performed in the state in which a temperature of 520° C. was maintained, and thereby a rolled sheet having a thickness of 3 mm was obtained. By performing a combination of rolling and heat treatment as appropriate on this rolled sheet in accordance with the desired thickness and temper, it was possible to obtain an aluminum material. For example, in the situation in which the aim was to obtain an aluminum material having a thickness of 0.070 mm and that has been tempered to an H14 material, cold rolling was performed on the rolled sheet to make the thickness 0.097 mm. Next, intermediate annealing was performed by maintaining the rolled sheet at a temperature of 360° C. for 3 hours. Then, cold rolling was further performed on the rolled sheet after the intermediate annealing to make the thickness 0.070 mm.

[Measurement of Surface-Area Ratio of Mg—Bi-Series Compounds]

The method of measuring the surface-area ratio of the Mg—Bi-series compounds in the aluminum material was as follows. First, a sample was prepared by cutting the aluminum material to expose an L-ST plane (that is, a surface parallel to both the rolling direction and the thickness direction of the aluminum material). After the L-ST plane of the sample was mirror polished, gold was vapor-deposited on the L-ST plane. Subsequently, surface analysis was performed using EPMA (i.e., an electronic-probe microanalyzer) to acquire a Bi element map of the L-ST plane. Then, the surface-area ratio of Bi relative to the surface area of the visual field was calculated by performing image analysis of the Bi element map.

Within the ranges of the chemical compositions of the aluminum materials according to the present invention, it is assumed that Bi is present only as Mg—Bi-series compounds. Accordingly, in the present example, it was possible to regard the surface-area ratio of the Bi calculated based on the Bi element map as the surface-area ratio of the Mg—Bi-series compounds. The surface-area ratio of the Mg—Bi-series compounds for each test material was the value shown in Table 1.

TABLE 1

| Test Material No. | Chemical Composition (mass %) | | | | | | | | Thickness (mm) | Temper | Surface-Area Ratio of Mg—Bi Compounds (%) |
| --- | --- | --- | --- | --- | --- | --- | --- | --- | --- | --- | --- |
| | Si | Fe | Cu | Mn | Mg | Zn | Bi | Sr | Al | | |
| S1 | 2.5 | 0.2 | — | 1.1 | 0.01 | 1.5 | 0.02 | — | Bal. | 0.2 | O | 0.10 |
| S2 | 2.5 | 0.2 | — | 1.1 | 0.05 | 1.5 | 0.02 | — | Bal. | 0.2 | O | 0.10 |
| S3 | 2.5 | 0.2 | — | 1.1 | 0.05 | 1.5 | 0.05 | — | Bal. | 0.2 | O | 1.51 |
| S4 | 2.5 | 0.2 | — | 1.1 | 0.05 | 1.5 | 0.1 | — | Bal. | 0.2 | O | 3.90 |
| S5 | 2.5 | 0.2 | — | 1.1 | 0.05 | 1.5 | 0.2 | — | Bal. | 0.2 | O | 7.00 |
| S6 | 2.5 | 0.2 | — | 1.1 | 0.5 | 1.5 | 0.1 | — | Bal. | 0.2 | O | 4.50 |
| S7 | 2.5 | 0.2 | — | 1.1 | 0.1 | 1.5 | 0.05 | — | Bal. | 0.07 | H14 | 1.48 |
| S8 | 2.5 | 0.2 | — | 1.1 | 0.025 | 1.5 | 0.02 | — | Bal. | 0.07 | H14 | 0.10 |
| S9 | 2.5 | 0.2 | — | 1.1 | 0.002 | 1.5 | 0.001 | — | Bal. | 0.2 | O | 0.00 |
| S10 | 2.5 | 0.2 | — | 1.1 | 0.01 | 1.5 | 0.001 | — | Bal. | 0.2 | O | 0.00 |
| S11 | 2.5 | 0.2 | — | 1.1 | 0.05 | 1.5 | 1 | — | Bal. | Casting not possible | | |
| S12 | 2.5 | 0.2 | — | 1.1 | 1 | 1.5 | 0.1 | — | Bal. | 0.2 | O | 4.68 |
| S13 | 2.5 | 0.2 | — | 1.1 | 0.5 | 1.5 | 0.001 | — | Bal. | 0.2 | O | 0.00 |
| S14 | 2.5 | 0.2 | — | 1.1 | 0.5 | 1.5 | 1 | — | Bal. | Casting not possible | | |
| S15 | 2.5 | 0.5 | 0.2 | 1.5 | 0.05 | 6 | 0.02 | 0.02 | Bal. | 0.2 | O | 0.10 |
| S16 | 2 | 0.2 | — | 1.1 | 0.05 | 1.5 | 0.02 | — | Bal. | 0.2 | O | 0.10 |
| S17 | 3 | 0.2 | — | 1.1 | 0.05 | 1.5 | 0.02 | — | Bal. | 0.2 | O | 0.10 |
| S18 | 1 | 0.2 | — | 1.1 | 0.05 | 1.5 | 0.05 | — | Bal. | 0.07 | H14 | 1.42 |
| S19 | 4 | 0.2 | — | 1.1 | 0.05 | 1.5 | 0.05 | — | Bal. | 0.07 | H14 | 1.55 |
| S20 | 2.5 | 0.03 | — | 1.1 | 0.05 | 1.5 | 0.05 | — | Bal. | 0.07 | H14 | 1.55 |
| S21 | 2.5 | 3 | — | 1.1 | 0.05 | 1.5 | 0.05 | — | Bal. | Casting not possible | | |
| S22 | 2.5 | 0.2 | — | 0.03 | 0.05 | 1.5 | 0.05 | — | Bal. | 0.07 | H14 | 1.50 |
| S23 | 2.5 | 0.2 | — | 2.5 | 0.05 | 1.5 | 0.05 | — | Bal. | Casting not possible | | |
| S24 | 2.5 | 0.2 | 0.8 | 1.1 | 0.05 | 1.5 | 0.05 | — | Bal. | 0.07 | H14 | 1.40 |
| S25 | 2.5 | 0.2 | — | 1.1 | 0.05 | 1.5 | 0.05 | 0.2 | Bal. | Casting not possible | | |

Working Example 2

In the present example, mini-core test specimens that simulate the core of a heat exchanger were prepared using the aluminum materials obtained in Working Example 1, and evaluations of brazeability and buckling resistance were performed based on the results of brazing the mini-core test specimens.

[Preparation of Mini-Core Test Specimen]

Figure 3:
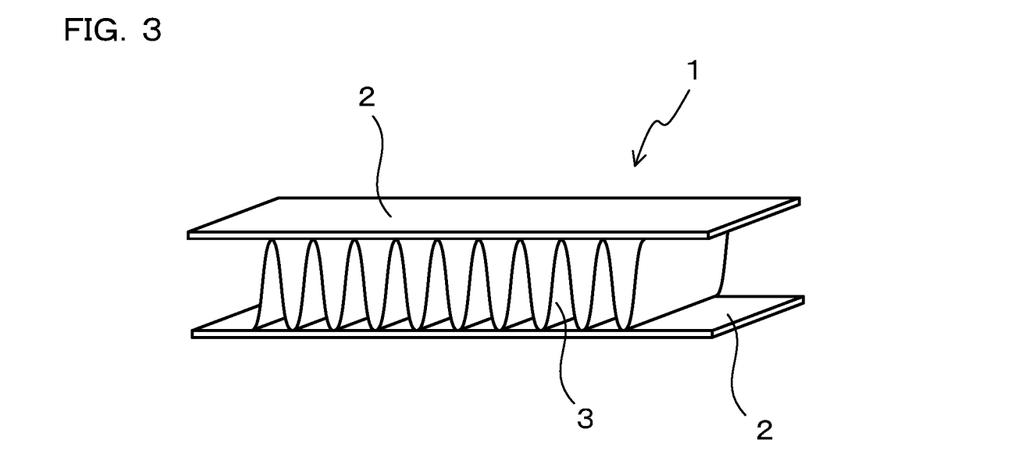
FIG. 3 is an oblique view of a mini-core test specimen according to Working Example 2.

As shown in FIG. 3, a mini-core test specimen 1 of the present example comprises two plates 2 and a corrugated fin 3 interposed between the plates 2, and the plates 2 and the corrugated fin 3 are joined to each other via brazed joints. The thickness of the plates 2 is 0.20 mm. The thickness of the corrugated fin 3 is 0.070 mm, the width is 16 mm, the crest height is 10 mm, and the pitch is 3 mm. In addition, the number of portions at which the plates 2 and the corrugated fin 3 make contact with each other is a total of 20 locations.

Specifically, either Test Materials S1-S6, S9-S10, S12-S13 in Working Example 1 or any of the sheet materials composed of A3003 alloy and having a thickness of 0.20 mm were used as the plates 2. In addition, either Test Materials S7-S8 in Working Example 1 or any of the sheet materials composed of A3003 alloy and having a thickness of 0.070 mm were used as the corrugated fin 3.

In preparing the mini-core test specimens 1, first, as shown in Table 2, etching was performed on either the plates 2 or the corrugated fin 3. Specifically, the plates 2 or the corrugated fin 3 were immersed in a liquid etchant for 90 seconds in order to remove oxide films present on the surfaces thereof. Subsequently, the plates 2 or the corrugated fin 3 that had been subject to etching were rinsed and subsequently dried. For example, it was possible to use a liquid mixture of a 2% aqueous solution of hydrofluoric acid and a 1% aqueous solution of nitric acid as the liquid etchant.

An assembly was prepared by overlapping, in the combination shown in Table 2, the plates 2 and the corrugated fin 3 prepared in this manner. It is noted that, when preparing the assembly, application of flux to the plates 2 and the corrugated fin 3 was not performed. After the assembly had been restrained using a jig made of stainless steel, the assembly was inserted into a brazing furnace and brazing was performed. In the present example, brazing was performed in a nitrogen atmosphere in which the oxygen concentration was 80 vol. ppm and the dew point was −50° C. In addition, the assembly was heated during brazing such that the required time from the point in time when the temperature inside the brazing furnace had reached 580° C. until the temperature reached 590° C. was 70 seconds.

When the assembly was heated and the temperature thereof went beyond the solidus line of the test material (i.e., the brazing, monolayer, aluminum-alloy material), the entire test material melted very slightly, and thereby a melt that included Al, Si, Mg, and Bi was formed. When the melt that had exuded from the test material made contact with the oxide films present on the surface of the test material, on the surface of the opposing material, or the like, $Al_2O_3$ that constituted the oxide films was reduced by Mg to become a spinel-type oxide $Al_2MgO_4$). Thereby, the oxide films present on the surface of the test material, on the surface of the opposing material, or the like were broken down, and brazed joints were formed between the test material and the opposing material.

Figure 4:
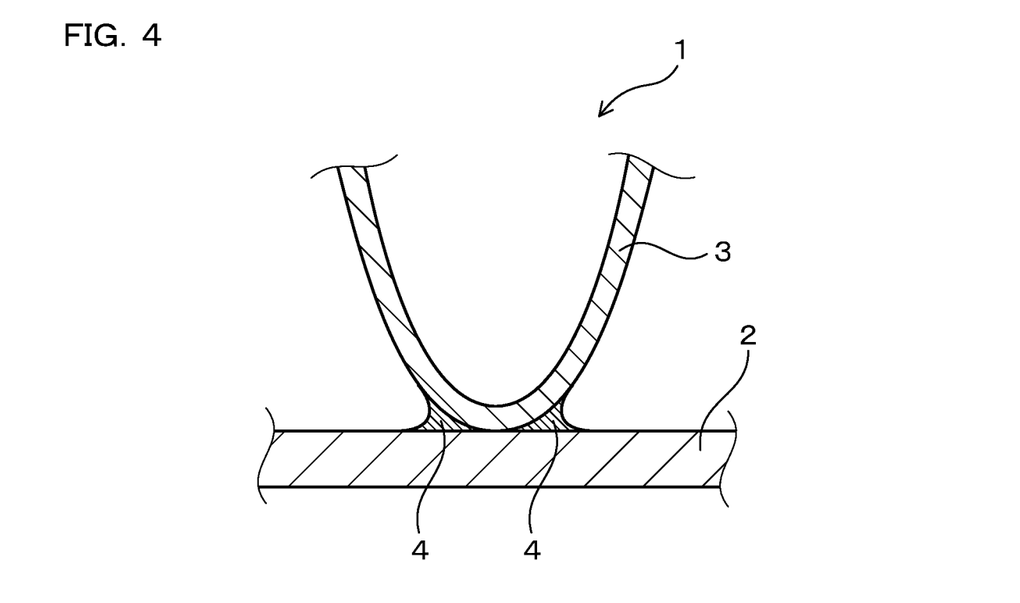
FIG. 4 is a partial, enlarged, cross-sectional view of a brazed joint between a plate and a corrugated fin according to Working Example 2.

That is, in the situation in which, for example, the corrugated fin 3 was constituted from a test material, oxide films present on the corrugated fin 3 and the plates 2 were broken down by the melt that had exuded from the corrugated fin 3. Then, as shown in FIG. 4, fillets 4, which were formed by the solidification of the melt between the corrugated fin 3 and the plates 2, were formed, and thereby the corrugated fin 3 and the plates 2 were brazed.

Based on the above, it was possible to obtain the mini-core test specimens 1 indicated by Test Nos. A1-A8 in Table 2. It is noted that the mini-core test specimens 1 indicated by Test Nos. A9-A12 in Table 2 were the mini-core test specimens 1 for comparison with the mini-core test specimens 1 indicated by Test Nos. A1-A8.

[Evaluation of Brazeability]

It was possible to evaluate the brazeability of the brazing, monolayer, aluminum-alloy material based on the bonding percentage between the plates 2 and the corrugated fin 3 of the mini-core test specimen 1. The calculation of the bonding percentage was performed specifically as follows. First, the corrugated fin 3 was separated from the mini-core test specimen 1 after brazing, and thereby traces of the fillets 4 that had been formed on the plates 2 were exposed. Then, the number of traces at which the fillets 4 had been formed across the entire width direction of the plates 2 was counted. Then, the ratio of the number of traces at which the fillets 4 had been formed over the entire width direction of the plates 2 relative to the total number (i.e., 20 locations) of portions at which the plates 2 and the corrugated fin 3 made contact with each other was taken as the bonding percentage.

The brazeability of each test material is shown in the "Brazeability" column in Table 2. It is noted that the meaning of symbols A-C recorded in the same column is as below. In the evaluation of brazeability, the situations of symbol A and symbol B, in which the bonding percentage is 40% or more, are judged as acceptable because they excel in brazeability, and the situation of symbol C, in which the bonding percentage is less than 40%, is judged as unacceptable because it is poor in brazeability.

A: Bonding percentage is 60% or more.
B: Bonding percentage is 40% or more and less than 60%.
C: Bonding percentage is less than 40%.

[Evaluation of Buckling Resistance]

With regard to evaluation of the buckling resistance of the brazing, monolayer, aluminum-alloy material, it was possible to perform evaluation based on the reduction percentage of the height of the corrugated fin 3 due to brazing, i.e., based on the ratio of the reduction amount of the height of the corrugated fin 3 due to brazing when the height of the corrugated fin 3 before brazing served as the reference. In the situation in which the strength of the corrugated fin 3 composed of the brazing, monolayer, aluminum-alloy material decreased during brazing and therefore buckling and deformation occurred, the height of the corrugated fin 3 after brazing became low relative to the height of the corrugated fin 3 before brazing.

In the present example, the reduction percentage of the height of the corrugated fin 3 was calculated for the mini-core test specimens 1 (i.e., Test Nos. A7-A8 in Table 2) comprising the corrugated fin 3 composed of the brazing, monolayer, aluminum-alloy material. Furthermore, in the "Buckling Resistance" column in Table 2, "Good" was recorded when the height reduction percentage was 10% or less, and "Poor" was recorded when the height reduction percentage was greater than 10%. It is noted that, with regard to the mini-core test specimens 1 comprising the corrugated fin 3 composed of A3003 alloy, because the calculation of the reduction percentage of the height of the corrugated fin 3 was not performed, the symbol "−" was recorded in the "Buckling Resistance" column in Table 2.

TABLE 2

| Test No. | Plate Material | Plate Etching | Corrugated Fin Material | Corrugated Fin Etching | Bonding Percentage | Buckling Resistance |
|---|---|---|---|---|---|---|
| A1 | S1 | Performed | A3003 | Not performed | A | — |
| A2 | S2 | Performed | A3003 | Not performed | A | — |
| A3 | S3 | Performed | A3003 | Not performed | A | — |
| A4 | S4 | Performed | A3003 | Not performed | A | — |
| A5 | S5 | Performed | A3003 | Not performed | A | — |
| A6 | S6 | Performed | A3003 | Not performed | B | — |
| A7 | A3003 | Performed | S7 | Not performed | B | Good |
| A8 | A3003 | Not performed | S8 | Performed | A | Good |
| A9 | S9 | Performed | A3003 | Not performed | C | — |
| A10 | S10 | Performed | A3003 | Not performed | C | — |
| A11 | S12 | Performed | A3003 | Not performed | C | — |
| A12 | S13 | Performed | A3003 | Not performed | C | — |

Test Materials S1-S8 (refer to Table 1) comprising the above-mentioned specific chemical compositions were used in the mini-core test specimens 1 indicated by Test Nos. A1-A8 in Table 2. These Test Materials S1-S8 exhibited excellent brazeability, even in an inert-gas atmosphere for a flux-free-brazing method in which the moisture content, the oxygen content, or the like is relatively large, and were able to increase the bonding percentage of the mini-core test specimens 1. Even among these test materials, in particular, Test Materials S1-S5 and Test Material S8 exhibited excellent brazeability compared with Test Materials S6 and S7, in which the Mg content was greater than these test materials.

In addition, the brazing, monolayer, aluminum-alloy materials having the above-mentioned specific chemical compositions exceled in buckling resistance as well. Consequently, by using the corrugated fin 3 composed of such aluminum materials, it was possible to curtail a decrease in the height of the corrugated fin 3 due to brazing.

On the other hand, Test Material S9 (refer to Table 1), in which the Mg content and the Bi content were below the above-mentioned specific ranges and that included practically no Mg—Bi-series compound, was used in the mini-core test specimen 1 indicated by Test No. A9 in Table 2. With regard to Test Material S9, because the amounts of Mg and Bi were small, the breakdown of oxide films during brazing heating became insufficient, and therefore the Test Material S9 was poor in brazeability compared with Test Materials S1-S8, as shown in Table 2.

Test Material S10 and Test Material S13 (refer to Table 1), in which the Bi content was below the above-mentioned specific range and in which Mg—Bi-series compounds were practically not formed, were used in the mini-core test specimens 1 indicated by Test No. A10 and Test No. A12 in Table 2. With regard to these test materials, because the amount of Bi was small, the breakdown of oxide films during brazing heating became insufficient, and therefore these test materials were poor in brazeability compared with Test Materials S1-S8, as shown in in Table 2.

Test Material S12 (refer to Table 1), in which the Mg content was above the above-mentioned specific range, was used in the mini-core test specimen 1 indicated by Test No. A11 in Table 2. With regard to Test Material S12, because oxide films tended to grow during brazing, Test Material S12 was poor in brazeability compared with Test Materials S1-S8, as shown in Table 2.

Working Example 3

In the present example, the mini-core test specimens 1 were prepared by performing brazing in an inert-gas atmosphere in which the moisture content, the oxygen content, or the like was smaller than that in Working Example 2, and evaluations of brazeability and buckling resistance were performed based on the results of the brazing of the mini-core test specimens 1. It is noted that the symbols, from among the symbols used in the present example, that are identical to the symbols used in the previous example indicate structural elements that are the same as the structural elements in the previous example, unless otherwise particularly described.

[Preparation of Mini-Core Test Specimen]

The structure of the mini-core test specimens 1 of the present example was the same as that of Working Example 2.

Specifically, Test Materials S15-S17 in Working Example 1 or any of the sheet materials composed of A3003 alloy and having a thickness of 0.20 mm were used in the plates 2. In addition, Test Materials S18-S20, S22, S24 in Working Example 1 or any of the sheet materials composed of A3003 alloy and having a thickness of 0.070 mm were used in the corrugated fin 3.

In the present example, after etching had been performed on the plates 2, the assembly was prepared by combining the plates 2 and the corrugated fin 3, as shown in Table 3. The liquid etchant and the etching conditions used in the etching were the same as those in Working Example 2. After restraining the assembly using a jig made of stainless steel, the assembly was inserted into the brazing furnace and brazing was performed. In the present example, brazing was performed in a nitrogen atmosphere in which the oxygen concentration was 1 vol. ppm and the dew point was −70° C. In addition, during brazing, the assembly was heated such that the required time from the point in time at which the temperature inside the brazing furnace had reached 580° C. until it reached 590° C. was 70 seconds.

Based on the above, it was possible to obtain the mini-core test specimens 1 indicated by Test Nos. B1-B3 in Table 3. It is noted that the mini-core test specimens 1 indicated by Test Nos. B4-B8 in Table 3 were the mini-core test specimens 1 for comparison with the mini-core test specimens 1 indicated by Test Nos. B1-B3.

In Table 3, the evaluation results for brazeability and buckling resistance of the brazing, monolayer, aluminum-alloy materials, which used the mini-core test specimens 1 of the present example, are shown. It is noted that the methods of evaluating brazeability and buckling resistance were the same as those in Working Example 2.

TABLE 3

| Test No. | Plate Material | Plate Etching | Corrugated Fin Material | Corrugated Fin Etching | Bonding Percentage | Buckling Resistance |
|---|---|---|---|---|---|---|
| B1 | S15 | Performed | A3003 | Not performed | A | — |
| B2 | S16 | Performed | A3003 | Not performed | A | — |
| B3 | S17 | Performed | A3003 | Not performed | A | — |
| B4 | A3003 | Performed | S18 | Not performed | C | Good |
| B5 | A3003 | Performed | S19 | Not performed | C | Poor |
| B6 | A3003 | Performed | S20 | Not performed | C | Poor |
| B7 | A3003 | Performed | S22 | Not performed | C | Poor |
| B8 | A3003 | Performed | S24 | Not performed | C | Poor |

Test Materials S15-S17 (refer to Table 1), having the above-mentioned chemical compositions, were used in the mini-core test specimens 1 indicated by Test Nos. B1-B3 in Table 3. These Test Materials S15-S17 exhibited excellent brazeability even in an atmosphere in which the moisture content, the oxygen content, or the like was relatively small, and it was possible to increase the bonding percentage of the mini-core test specimens 1.

On the other hand, Test Material S18 (refer to Table 1), in which the Si content was below the above-mentioned specific range, was used in the mini-core test specimen 1 indicated by Test No. B4. Test Material S18 was poor in brazeability compared with Test Materials S15-S17, as shown in Table 3, because the amount of melt that could be supplied to the portion to be joined during brazing was small.

Test Material S19 (refer to Table 1), in which the Si content was above the above-mentioned specific range, was used in the mini-core test specimen 1 indicated by Test No. B5. Because the amount of melt formed during brazing became excessive, Test Material S19 could not maintain strength and was poor in brazeability and buckling resistance compared with Test Materials S15-S17, as shown in Table 3.

Test Material S20 (refer to Table 1), in which the Fe content was below the above-mentioned specific range, was used in the mini-core test specimen 1 indicated by Test No. B6. Test Material S20 was poor in brazeability and buckling resistance compared with Test Materials S15-S17, as shown in Table 3, because the strength at high temperature tended to decrease.

Test Material S22 (refer to Table 1), in which the Mn content was below the above-mentioned specific range, was used in the mini-core test specimen 1 indicated by Test No. B7. Test Material S22 was poor in brazeability and buckling resistance compared with Test Materials S15-S17, as shown in Table 3, because the strength tended to become low.

Test Material S24, in which the Cu content was above the above-mentioned specific range, as shown in Table 1, was used in the mini-core test specimen 1 indicated by Test No. B8. Test Material S24 was poor in brazeability and buckling resistance compared with Test Materials S15-S17, as shown in Table 3, because the amount that melted during brazing became excessive and therefore the strength tended to become low.

The invention claimed is:

1. A brazing, monolayer, aluminum-alloy material having:
   a chemical composition composed of Si: 1.5 mass % or more and 3.5 mass % or less, Fe: 0.05 mass % or more and 2.00 mass % or less, Mn: 0.1 mass % or more and 2.0 mass % or less, Mg: 0.005 mass % or more and 0.500 mass % or less, and Bi: 0.010 mass % or more and 0.500 mass % or less, the remainder being Al and unavoidable impurities; and
   a metallographic structure in which Mg—Bi-series compounds are dispersed in an Al matrix;
   wherein the surface-area ratio of the Mg—Bi-series compounds in any arbitrary cross section is 0.05% or more.

2. The brazing, monolayer, aluminum-alloy material according to claim 1, wherein one or more elements selected from the group consisting of Zn: 6.0 mass % or less, In: 0.1 mass % or less, Sn: 0.1 mass % or less, Cu: 0.6 mass % or less, Zr: 0.3 mass % or less, and Ti: 0.3 mass % or less are further included in the brazing, monolayer, aluminum-alloy material.

3. The brazing, monolayer, aluminum-alloy material according to claim 2, wherein the Zn content is 0.05-4.0 mass %.

4. The brazing, monolayer, aluminum-alloy material according to claim 2, wherein the Zn content is 0.5-3.0 mass %.

5. The brazing, monolayer, aluminum-alloy material according to claim 1, wherein one or more elements selected from the group consisting of Sr: 0.1 mass % or less, Na: 0.1 mass % or less, and Sb: 0.3 mass % or less are further included in the brazing, monolayer, aluminum-alloy material.

6. A method of manufacturing an aluminum structure in which the brazing, monolayer, aluminum-alloy material according to claim 1 is used, comprising:
   preparing an assembly, which comprises the brazing, monolayer, aluminum-alloy material and an opposing material that makes contact with the brazing, monolayer, aluminum-alloy material, and wherein etching is performed on at least one from among the brazing, monolayer, aluminum-alloy material and the opposing material;
   forming a melt, in which a portion of the brazing, monolayer, aluminum-alloy material is melted by heating the assembly under heating conditions in which the temperature is within the range of 580° C.-590° C. and the time is 30 seconds or more; and
   preparing the aluminum structure, in which the assembly is brazed by the melt.

7. The brazing, monolayer, aluminum-alloy material according to claim 1, wherein the Si content is 2.0-3.0 mass %.

8. The brazing, monolayer, aluminum-alloy material according to claim 1, wherein the Mg content is 0.010-0.200 mass %.

9. The brazing, monolayer, aluminum-alloy material according to claim 1, wherein the Mg content is 0.010-0.050 mass %.

10. The brazing, monolayer, aluminum-alloy material according to claim 1, wherein the Bi content is 0.010-0.100 mass %.

11. The brazing, monolayer, aluminum-alloy material according to claim 1, wherein the Fe content is 0.10-2.00 mass %.

12. The brazing, monolayer, aluminum-alloy material according to claim 1, wherein the surface-area ratio of the Mg—Bi-series compounds in any arbitrary cross section is 0.10% or more.

13. The brazing, monolayer, aluminum-alloy material according to claim 1, wherein the brazing, monolayer, aluminum-alloy material has a sheet thickness of less than 0.15 mm.

14. The brazing, monolayer, aluminum-alloy material according to claim 1, wherein:
   the Si content is 2.0-3.0 mass %;
   the Mg content is 0.010-0.050 mass %;
   the Bi content is 0.010-0.100 mass %; and
   the Fe content is 0.10-2.00 mass %.

15. The brazing, monolayer, aluminum-alloy material according to claim 14, wherein the Zn content is 0.5-3.0 mass %.

16. The brazing, monolayer, aluminum-alloy material according to claim 15, wherein the surface-area ratio of the Mg—Bi-series compounds in any arbitrary cross section is 0.10% or more.

17. The brazing, monolayer, aluminum-alloy material according to claim 16, wherein the brazing, monolayer, aluminum-alloy material has a sheet thickness of less than 0.15 mm.

18. A method of manufacturing an aluminum structure, comprising:
   providing the brazing, monolayer, aluminum-alloy material according to claim 1;
   providing an opposing material;
   etching at least one of the brazing, monolayer, aluminum-alloy material and the opposing material;
   preparing an assembly by placing the brazing, monolayer, aluminum-alloy material in contact with the opposing material;
   heating the assembly at temperature within a range of 580° C.-590° C. for 30 seconds or more to generating a melt on a surface of the brazing, monolayer, aluminum-alloy material that contacts the opposing material; and allowing the melt to solidify to prepare the aluminum structure with one or more brazed joints formed by the solidified melt between the brazing, monolayer, aluminum-alloy material and the opposing material.

19. A monolayer aluminum-alloy material suitable for brazing, having:
an aluminum alloy composition comprising Si: 1.5-3.5 mass %, Fe: 0.05-2.00 mass %, Mn: 0.1-2.0 mass %, Mg: 0.005 mass %-0.500 mass %, and Bi: 0.010-0.500 mass %;
wherein:
the aluminum alloy composition has a metallographic structure in which Mg—Bi-series compounds are dispersed in an Al matrix; and
the surface-area ratio of the Mg—Bi-series compounds in any arbitrary cross section is 0.05% or more.

20. The monolayer aluminum-alloy material according to claim 19, wherein the aluminum alloy composition:
is present on all outermost surfaces of the monolayer aluminum-alloy material and throughout the monolayer aluminum-alloy material, and
melts in a temperature range of 580° C.-590° C.

* * * * *